United States Patent
Tsai et al.

(10) Patent No.: US 12,413,609 B2
(45) Date of Patent: Sep. 9, 2025

(54) ANOMALY INSPECTION APPLIANCE AND ANOMALY INSPECTION METHOD BASED ON CORRELATIONS OF PACKETS

(71) Applicant: TXONE NETWORKS INC., Hsinchu (TW)

(72) Inventors: Wen-Yen Tsai, Hsinchu (TW); Hung-Sheng Huang, Hsinchu (TW)

(73) Assignee: TXONE NETWORKS INC., Hsinchu (TW)

( * ) Notice: Subject to any disclaimer, the term of this patent is extended or adjusted under 35 U.S.C. 154(b) by 226 days.

(21) Appl. No.: 18/210,050

(22) Filed: Jun. 14, 2023

(65) Prior Publication Data

US 2024/0422182 A1 Dec. 19, 2024

(51) Int. Cl.
*H04L 9/40* (2022.01)

(52) U.S. Cl.
CPC ........ *H04L 63/1425* (2013.01); *H04L 63/145* (2013.01)

(58) Field of Classification Search
CPC ............. H04L 63/1416; H04L 63/1425; H04L 63/145
See application file for complete search history.

(56) References Cited

U.S. PATENT DOCUMENTS

| 10,887,107 B1* | 1/2021 | Chan ..................... H04L 9/3271 |
| 2017/0251012 A1* | 8/2017 | Stockdale ............... H04L 63/10 |
| 2020/0076841 A1 | 3/2020 | Hajimirsadeghi et al. |
| 2021/0099470 A1* | 4/2021 | Lin ...................... H04L 63/1416 |
| 2022/0131748 A1* | 4/2022 | Smith .................. H04L 41/0668 |
| 2023/0076346 A1* | 3/2023 | Sui .......................... G06F 21/57 |
| 2023/0199029 A1* | 6/2023 | Guo ......................... H04L 63/20 726/1 |
| 2023/0342453 A1* | 10/2023 | Atzur .................... G06F 21/552 |

OTHER PUBLICATIONS

Vitor Graveto et al: "A stealth monitoring mechanism for cyber-physical systems", International Journal on Critical Infrastructure Protection, Elsevier, Amsterdam, NL, vol. 24, Oct. 22, 2018, pp. 126-143.
Search Report dated Nov. 28, 2023 of the corresponding European patent application No. 23179496.7.

* cited by examiner

*Primary Examiner* — Mohamed A. Wasel
(74) *Attorney, Agent, or Firm* — Chun-Ming Shih; HDLS IPR SERVICES

(57) ABSTRACT

A method and an appliance for anomaly inspection based on correlations of packets are provided. The appliance has a processing unit, a first communication channel, and a second communication channel. The first communication channel transmits a first packet under a first communication protocol and the second communication channel transmits a second packet under a second communication protocol. The processing unit performs a field breakdown procedure to the first packet and the second packet to respectively obtain multiple packet fields of the two packets, matching relevant fields of the two packets based on a correlation database and computing the correlation of the relevant fields.

13 Claims, 5 Drawing Sheets

| First Communication Protocol | Second Communication Protocol | Correlation Type |
|---|---|---|
| First Field A | Second Field A | Proportional Related |
| First Field B | Second Field C,D | Inverse Related |
| First Field C,H | Second Field G | Linear Related |
| ⋮ | ⋮ | ⋮ |

FIG.4

ANOMALY INSPECTION APPLIANCE AND ANOMALY INSPECTION METHOD BASED ON CORRELATIONS OF PACKETS

BACKGROUND OF THE DISCLOSURE

Technical Field

The present disclosure relates to an inspection for abnormal packets, and particularly a method and appliance for anomaly inspection implemented by considering the correlations of fields of packets transmitted through two communication channels.

Description of Related Art

In the industrial controlling field, it is common of using the operation technology (OT) to monitor and control industrial devices, procedures, and data. Controllers (such as PLC) in the OT field may use same or different communication protocols to connect with the field devices and the monitoring devices (such as HMI and SCADA), so as to implement immediately transmission for data and instructions.

Malicious attacks aimed at the OT field, such as hackers or viruses (e.g., Stuxnet), evade security via sending spoofed reporting messages. For example, a hacker may hack into the controller to send the spoofed reporting messages to the monitoring device through the communication channel between the controller and the monitoring device. Therefore, all the supervisor can see is fake information. On the other hand, the hacker may send fake instructions to the field apparatus through the communication channel between the controller and the field apparatus to misguide the field apparatuses to execute wrong operations after hacking into the controller.

In particular, after hacking into the controller, the hacker may attack the OT field in a bi-direction matter. Facing the upstream, the hacker misguides the controller to send spoofed reporting messages to cheat on the supervisors (such as tampering the device data shown on the HMI): facing the downstream, the hacker misguides the controller to send spoofed reporting instructions for the field apparatuses to execute wrong operations.

According to the above problems, an inspecting matter is needed in the market to directly inspect whether the packets transmitted through the communication channel(s) are abnormal and issue an alarm while an anomaly is inspected, so as to exclude the malicious attacks from hackers or viruses.

SUMMARY OF THE DISCLOSURE

The present disclosure is directed to a method and an appliance for anomaly inspection based on correlations of packets, which may inspect whether the packets are abnormal based on the correlations of the fields between packets sent from the controller and packets received by the controller.

In one of the exemplary embodiments, the anomaly inspection appliance based on correlations of packets of the present disclosure includes:
  a first communication channel, configured to transmit a first packet using a first communication protocol;
  a second communication channel, configured to transmit a second packet using a second communication protocol;
  a storing unit, storing a correlation database, wherein the correlation database records multiple relevant fields of same communication protocol or different communication protocols and a correlation type of each of the relevant fields; and
  a processing unit connected with the first communication channel, the second communication channel, and the storing unit, configured to perform a field breakdown procedure to the first packet and the second packet to respectively obtain multiple first packet fields and multiple second packet fields, match one of the multiple first packet fields with one of the multiple second packet fields based on the correlation database to compute a correlation, and issue an alarm when the correlation being computed is unmatched with the correlation type.

In one of the exemplary embodiments, the anomaly inspection method based on correlations of packets of the present disclosure is incorporated with the anomaly inspection appliance and includes following steps:
  a) transmitting a first packet using a first communication protocol and a second packet using a second communication protocol respectively through the first communication channel and the second communication channel;
  b) performing a field breakdown procedure to the first packet and the second packet to respectively obtain multiple first packet fields and multiple second packet fields;
  c) matching one of the multiple first packet fields with one of the multiple second packet fields based on the correlation database, wherein the correlation database records multiple relevant fields of same communication protocol or different communication protocols and a correlation type of the relevant fields;
  d) computing a correlation of one of the multiple first packet fields and one of the multiple second packet fields being matched; and
  e) issuing an alarm when the correlation is determined to be unmatched with the correlation type.

Comparing with related art, the present disclosure monitors the correlations of relevant fields in the packets transmitted through an upstream communication channel and a downstream communication channel to directly determine whether the packets are abnormal and issues an alarm when the packets are inspected to be anomaly.

BRIEF DESCRIPTION OF THE DRAWINGS

FIG. 4 is a schematic diagram of a correlation database of an embodiment according to the present disclosure.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses an anomaly inspection appliance adopted in the industrial controlling field. The anomaly inspection appliance is connected at the front end of a controller, such as a programmable logic controller (PLC). More specifically, the controller is connected with the anomaly inspection appliance of the present disclosure, and the controller connect to a monitoring apparatus and a field apparatus through the anomaly inspection appliance.

In the industrial controlling field, a system is usually arranged with a real-time monitoring mechanism. Therefore, a supervisor may not only issue instructions to the controller, but also check data of each field apparatus in real-time. When a hacker hacks into the system (such as hacking into the controller), he or she may control the controller to send spoofed reporting messages to cheat on the supervisor who is in charging of the monitoring or to send spoofed reporting instructions to misguide the field apparatus to execute wrong operations. To solve the problems as mentioned above, the present disclosure provides the anomaly inspection appliance connected at the front end of the controller, to inspect the packets transmitted by the controller to ensure whether malicious behaviors exist in the controller. In sum, the information security over the Internet may be improved effectively through using the anomaly inspection appliance of the present disclosure.

Figure 1:
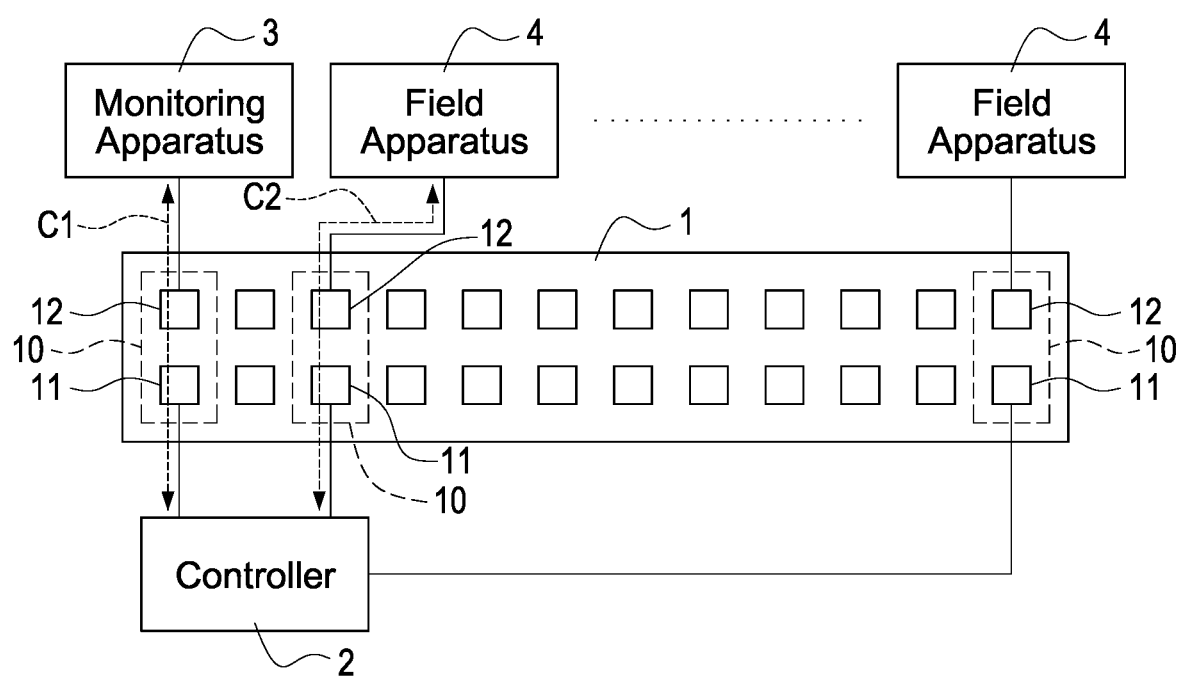
FIG. 1 is a schematic diagram showing the connection of an anomaly inspecting appliance of an embodiment according to the present disclosure.

Please refer to FIG. 1, which is a schematic diagram showing the connection of an anomaly inspecting appliance of an embodiment according to the present disclosure. As disclosed in FIG. 1, the anomaly inspection appliance 1 is connected between a controller 2 and a monitoring apparatus 3 as well as connected between the controller 2 and a field apparatus 4. In one embodiment, the monitoring apparatus 3 may be, for example but not limited to, a human machine interface (HMI) or a supervisory control and data acquisition (SCADA) system, and the field apparatus 4 may be, for example but not limited to, an electronic device such as a pressure sensor, a temperature sensor, or a motor, etc.

A technical feature of the present disclosure is that the anomaly inspection appliance 1 inspects correlations between packets transmitted between the controller 2 and the monitoring apparatus 3 (called upstream packets) and packets transmitted between the controller 2 and the field apparatus 4 (called downstream packets) and determines whether the packets being transmitted are abnormal in accordance with the inspecting result of the correlations. In other words, the anomaly inspection appliance 1 determines whether the packets currently transmitted are spoofed reporting packets generated by the controller 2 after the controller 2 suffers from malicious attacks by hackers or viruses based on inspecting the correlations.

As shown in FIG. 1, the anomaly inspection appliance 1 has multiple input ports 11 and multiple output ports 12, wherein one of the multiple input ports 11 and one of the multiple output ports 12 are paired to be a communication group 10. For example, if the anomaly inspection appliance 1 includes twenty input ports 11 and twenty output ports 12, ten communication groups 10 may be paired in advance which each of the ten communication groups 10 respectively includes one input port 11 and one output port 12 being paired. It is worth saying that according to an actual transmission direction of the packets, the output ports 12 in the present disclosure may be used to receive the packets while the input ports 11 in the present disclosure may be used to send the packets out, the ports 11 and 12 are not limited to their literal meanings.

The anomaly inspection appliance 1 establishes a communication channel by one communication group 10, so the anomaly inspection appliance 1 connects with external devices to transmit communication packets with the external devices (including receiving communication packets and sending the communication packets being inspected) through the communication channel.

In the embodiment of FIG. 1, the anomaly inspection appliance 1 connects to the controller 2 through the input port 11 of one of the communication groups 10 (a first input port for example) and connects to the monitoring apparatus 3 through the output port 12 of the communication group 10 (a first output port for example), where a first communication channel C1 between the controller 2 and the monitoring apparatus 3 is formed through the first input port and the first output port. The anomaly inspection appliance 1 connects to the controller 2 through the input port 11 of another communication group 10 (a second input port for example) and connects to one of multiple field apparatuses 4 through the output port 12 of the group 10 (a second output port for example), where a second communication channel C2 is formed between the controller 2 and the field apparatus 4 being connected through the second input port and the second output port. The technical feature of the present disclosure is that the anomaly inspection appliance 1 inspects the correlations between specific fields of the packets transmitted through the first communication channel C1 (such as first packets) and packets transmitted through the second communication channel C2 (such as second packets) to determine whether the packets are abnormal and exist malicious attacking behaviors.

In the embodiment of FIG. 1, the anomaly inspection appliance 1 directly connects to the monitoring apparatus 3 and the field apparatus 4 through the output ports 12 (including the first output port and the second output port).

In the present disclosure, the anomaly inspection appliance 1 may monitor the status of the controller 2 being hacked. As a result, even if the anomaly inspection appliance 1 first connects to a relay device such as a switch or a router through the output port 12 and then transfers to the monitoring apparatus 3 and the field apparatus 4, the anomaly inspection appliance 1 may still inspect the existence of malicious attacking behaviors.

In particular, after the field apparatus 4 generates data packets and transmits the data packets to the controller 2, the controller 2 executes necessary processes to the data packets and then transmits the processed data packets to the monitoring apparatus 3, therefore, the monitoring apparatus 3 may show the data feedbacked from the field apparatus 4 on the screen (not shown) in real-time. When the supervisor wants to control the field apparatus 4, he or she may control the monitoring apparatus 3 to send instruction packets to the controller 2. The controller 2 receives the instruction packets and executes necessary processes to the instruction packets, and then transmits the processed instruction packets to the field apparatus 4 designated by the supervisor, so as to control the field apparatus 4 to perform corresponding operations.

It can be understood from the above description that, under a normal operation, a correlation exists between the first packet transmitted by the anomaly inspection appliance 1 through the first communication channel C1 and the second packet transmitted by the anomaly inspection appliance 1 through the second communication channel C2. If no expected correlation exists between the first packet and the second packet, it means that at least one of the first packet and the second packet may be the spoofed reporting packet generated by the controller 2 suffered from malicious attacks.

In one embodiment, the first packet transmitted through the first communication channel C1 uses a first communication protocol (such as OPC or Modbus) and the second packet transmitted through the second communication channel C2 uses a second communication protocol (such as MELSEC or CC-Link IE). More specifically, the first packet transmitted through the first communication channel C1 and the second packet transmitted through the second communication channel C2 may either use identical communication protocol or use different communication protocols.

The present disclosure uses the anomaly inspection appliance 1 to execute an inspection procedure for the packets. To implement the inspection purpose, the anomaly inspection appliance 1 must be a network appliance capable of executing an application program, receiving, and transmitting packets in the communication channel(s), and reading and analyzing the protocol and contents of the packets being transmitted. In one embodiment, the anomaly inspection appliance 1 may be implemented by a router or a switch which has Ethernet connection ports.

Figure 2:
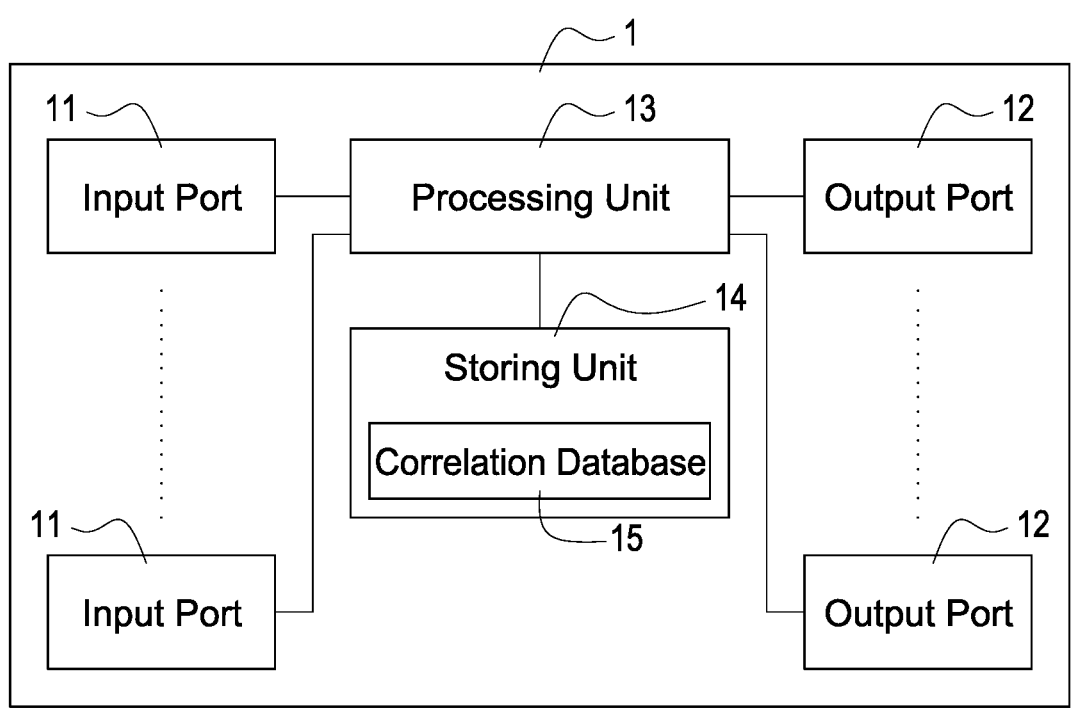
FIG. 2 is a block diagram of an anomaly inspection appliance of an embodiment according to the present disclosure.

Please refer to FIG. 1 and FIG. 2 at the same time, wherein FIG. 2 is a block diagram of an anomaly inspection appliance of an embodiment according to the present disclosure. As shown in FIG. 2, the anomaly inspection appliance 1 has multiple input ports 11, multiple output ports 12, a processing unit 13, and a storing unit 14, wherein the processing unit 13 is electrically connected with the multiple input ports 11, the multiple output ports 12, and the storing unit 14.

As mentioned above, two paired input port 11 and output port 12 may form a communication channel. For the sake of understanding, an example using a first communication channel C1 connecting the controller 2 with the monitoring apparatus 3 and a second communication channel C2 connecting the controller 2 with the field apparatus 4 is taken for following interpretation.

The storing unit 14 may be, for example but not limited to, a hard disk drive (HDD), a solid-state disk (SDD), a non-volatile memory, or an optical disk, etc. The storing unit 14 stores a correlation database 15. The correlation database 15 records one or more relevant fields of same communication protocol or different communication protocols as well as a correlation type of these relevant fields.

In the present disclosure, before inspection, the anomaly inspection appliance 1 transmits packets with different communication protocols respectively through the first communication channel C1 and the second communication channel C2 and matches multiple packet fields in the packets being transmitted (including upstream packets and corresponding downstream packets) to find the correlations of the packet fields of different communication protocols.

For example, if recorded data in a second packet field A of a second packet (using a second communication protocol) gets bigger while recorded data in a first packet field A of a first packet (using a first communication protocol) gets bigger, the anomaly inspection appliance 1 may determine that the first packet field A and the second packet field A are relevant fields with a correlation type being proportional related. For another example, if recorded data in a second packet field G and a second packet filed H of a second packet (using a second communication protocol) gets smaller while recorded data in a first packet field B of a first packet (using a first communication protocol) gets bigger, the anomaly inspection appliance 1 may determine that the first packet field B, the second packet field G, and the second packet field H are relevant fields with a correlation type being inverse related. After the inspection, the anomaly inspection appliance 1 records the correlations of these packet fields as well as the correlation types of these correlations to establish the correlation database 15.

The processing unit 13 may be, for example but not limited to, a micro control unit (MCU), a central processing unit (CPU), a programmable logic controller (PLC), or a system on chip (SoC), etc.

Under an inspection mode, the anomaly inspection appliance 1 transmits a first packet using a first communication protocol through the first communication channel C1 and transmits a second packet using a second communication protocol through the second communication channel C2. In one embodiment, the destination of the first packet is the source of the second packet. In another embodiment, the destination of the second packet is the source of the first packet.

The processing unit 13 performs a field breakdown procedure to the first packet to respectively obtain multiple first packet fields of the first packet. Also, the processing unit 13 performs the field breakdown procedure to the second packet to respectively obtain multiple second packet fields of the second packet. Next, the processing unit 13 inquiries the correlation database 15 from the storing unit 14 and then matches one of the multiple first packet fields with one of the multiple second packet fields in accordance with the content of the correlation database 15. In other words, the processing unit 13 finds one or more relevant fields from the correlation database 15 based on the first communication protocol and the second communication protocol.

Next, the processing unit 13 computes a correlation between one of the multiple first packet fields and one of the multiple second packet fields (e.g., proportional related, inverse related, linear related, or unrelated), and determines whether the correlation of these packet fields matches with the correlation type recorded in the correlation database 15. If the correlation being computed is unmatched with the correlation type or the difference between the degree of the correlation being computed and the correlation type being recorded is greater than a tolerance, the processing unit 13 determines that either the first packet or the second packet includes a spoofed reporting message generated by the controller 2 after the controller 2 suffered from the malicious attack, so the processing unit 13 actively issues an alarm.

For an example, the first packet uses a communication protocol of S7comm, the second packet uses a communication protocol of PROFINET, and the correlation database 15 records that a first packet field A of the communication protocol of S7comm is inverse related to a second packet field Z of the communication protocol of PROFINET. In the embodiment, when the processing unit 13 transmits the first packet using S7comm through the first communication channel C1 and transmits the second packet using PROFINET through the second communication channel C2, but finds that the first packet field A of the first packet is irrelated to the second packet field Z of the second packet after breaking the packets down and matching the fields, the processing unit 13 may determine that at least one of the first packet and the second packet includes the spoofed reporting message generated after suffering from the malicious attack.

However, the above description is only one exemplary embodiment of the present disclosure, but not limited thereto.

In particular, the correlation type mentioned above may include proportional related, inverse related, or liner related, etc., but not limited. When performing inspection, the processing unit 13 inquiries the content of the correlation database 15 to obtain the first packet field and the second packet field that are correlated with each other (i.e., the relevant fields). Also, the processing unit 13 computes a correlation of the first packet field and the second packet field based on the recorded data in the first packet field and the recorded data in the second packet field. When determining that the correlation of the first packet field and the second packet field is unmatched with the correlation type recorded correspondingly in the correlation database 15, or a difference between the degree of the correlation being computed and the correlation type recorded correspondingly in the correlation database 15 is greater than a tolerance, the processing unit 13 issues an alarm.

In one embodiment, the anomaly inspection appliance 1 issues the alarm through its displaying unit or speaker (not shown in the figures). In another embodiment, the anomaly inspection appliance 1 issues the alarm through sending the log file of the packets. In another embodiment, the anomaly inspection appliance 1 issues the alarm via sending e-mails or making phone calls to the supervisor.

For an example, the field apparatus 4 is a temperature sensor and transmits temperature data (temperature of Fahrenheit) to the controller 2 through using the first packet. The controller 2 retrieves the temperature data from the first packet, transforms the temperature data into temperature of Celsius, and then transmits to the monitoring apparatus 3 through using the second packet. In the embodiment, though the recorded data in the data field of the first packet is different from the recorded data in the data field of the second packet, but the data respectively recorded in these two fields may be linear related. In this embodiment, if a hacker attacks the controller 2 to modify the recorded data in any of the data fields of any packet, the anomaly inspection appliance 1 of the present disclosure may determine that the packet is abnormal and issue an alarm when determining that the recorded data in the data fields of the two packets are not linear related.

Figure 3:
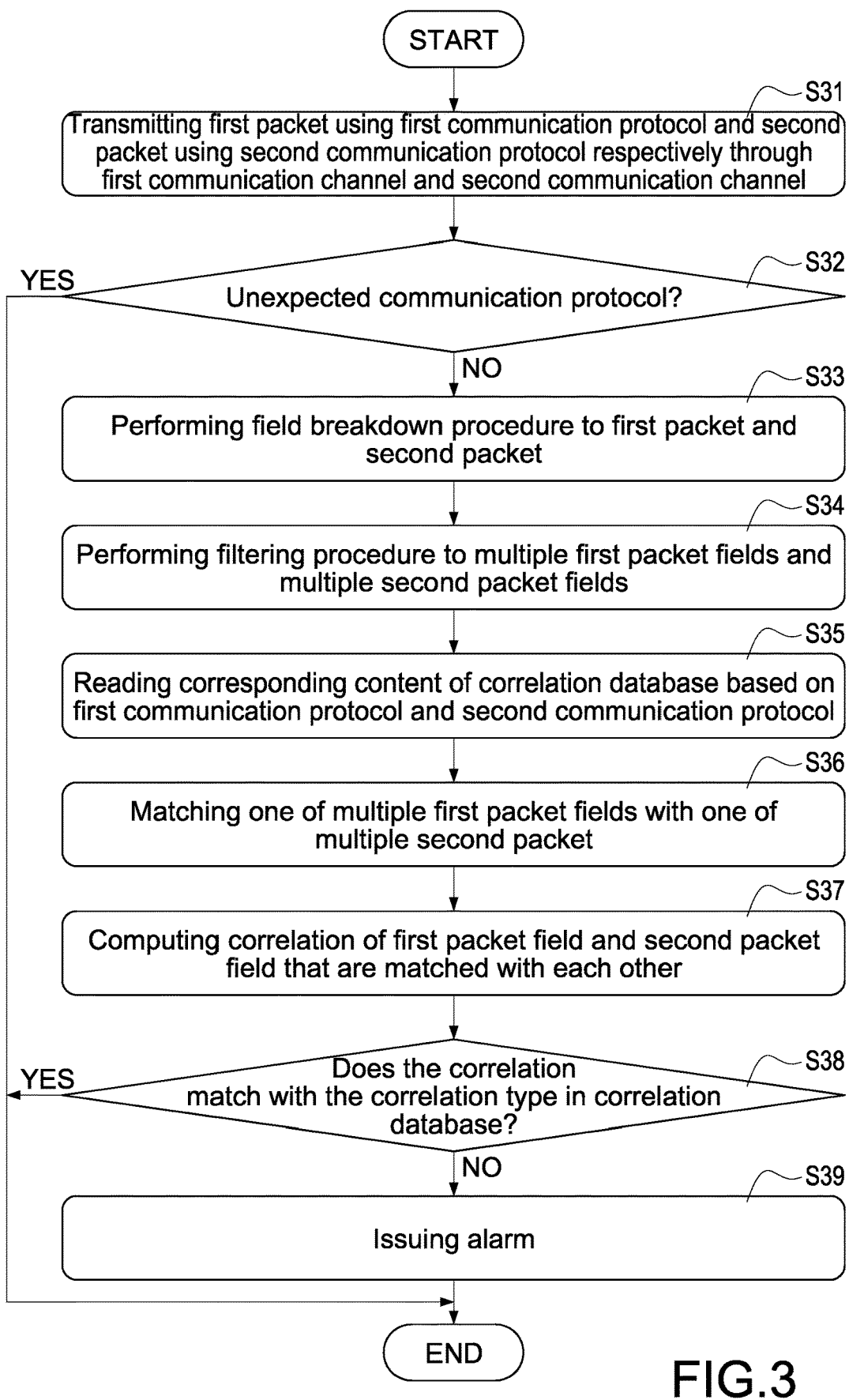
FIG. 3 is a flowchart of an anomaly inspection method of an embodiment according to the present disclosure.

Please refer to FIG. 1 through FIG. 3 at the same time, wherein FIG. 3 is a flowchart of an anomaly inspection method of an embodiment according to the present disclosure. FIG. 3 discloses an anomaly inspection method based on correlations of packets of the present disclosure (referred to as the anomaly inspection method hereinafter), and the anomaly inspection method is incorporated with the anomaly inspection appliance 1 as shown in FIG. 1 and FIG. 2.

As shown in FIG. 3, when performing inspection, the anomaly inspection appliance 1 transmits the first packet using the first communication protocol and the second packet using the second communication protocol respectively through the first communication channel C1 (such as connecting the controller 2 with the monitoring apparatus 3) and the second communication channel C2 (such as connecting the controller 2 with the field apparatus 4) (step S31), wherein the first communication protocol and the second communication protocol may be identical communication protocol or different communication protocols.

In one embodiment, the first packet is a packet sent by the monitoring apparatus 3 to the controller 2 to operate the field apparatus 4 and the second packet is a packet generated and sent by the controller 2 to the field apparatus 4 in accordance with the content of the first packet. In another embodiment, the first packet is a packet sent by the field apparatus 4 to the controller 2 to report data and the second packet is a packet generated and sent by the controller 2 to the monitoring apparatus 3 to show the recorded data in the first packet on the monitoring apparatus 3. However, the above description are only few embodiments of the present disclosure. In the present disclosure, the first packet and the second packet being inspected by the anomaly inspection appliance 1 respectively record relevant data content.

Next, the anomaly inspection appliance 1 performs the field breakdown procedure to the first packet and the second packet to respectively obtain multiple first packet fields of the first packet and multiple second packet fields of the second packet (step S33).

It should be mentioned that after the step S31, the anomaly inspection appliance 1 may first determine whether the first communication protocol and the second communication protocol are an unexpected communication protocol (step S32).

More specific, according to the supervisor's statistics and experiences or due to the limitations of transmission technologies, a part of the communication protocols cannot be used to send viruses or initiate malicious attacks. Therefore, the anomaly inspection appliance 1 may record multiple communication protocols that are related to viruses and malicious attacks (i.e., expected communication protocols) in advance. If one of the first communication protocol and the second communication protocol is determined to be out of the multiple expected communication protocols in the step S32, it means that it is highly possible that the first packet or the second packet is irrelevant to viruses and malicious attacks. In such a circumstance, the anomaly inspection appliance 1 does not inspect the first packet and the second packet to speed up the effect of transmitting the packets.

If the first communication protocol and the second communication protocol are respectively determined to be one of the multiple expected communication protocols in the step S32, the anomaly inspection appliance 1 proceeds to execute step S33 to inspect the first packet and the second packet.

Because both of the first communication protocol and the second communication protocol are expected communication protocols, in the step S33, the anomaly inspection appliance 1 may directly know the packet structure of the first communication protocol and the second communication protocol. Therefore, the anomaly inspection appliance 1 may perform the field breakdown procedure to the first packet and the second packet based on known format information. The detailed field breakdown technique is omitted here.

After the step S33, the anomaly inspection appliance 1 reads the corresponding content of the correlation database 15 based on the first communication protocol and the second communication protocol (step S35), and matches one of the multiple first packet fields with one of the multiple second packet fields based on the content of the correlation database 15 being read (step S36). As mentioned above, the correlation database 15 records one or more relevant fields of same communication protocol or different communication protocols as well as the correlation type of these relevant fields. Therefore, the anomaly inspection appliance 1 may know which relevant fields exist between the first communication protocol and the second communication protocol as well as the correlation type of these relevant fields by reading the content of the correlation database 15 in the step S35.

In one embodiment, the relevant fields have a one-to-one relationship. In another embodiment, the relevant fields have a one-to-many relationship. In another embodiment, the relevant fields have a many-to-one relationship. In another embodiment, the relevant fields have a many-to-many relationship.

It should be mentioned that, after the step S33, the anomaly inspection appliance 1 may perform a filtering procedure to the multiple first packet fields and the multiple second packet fields by the processing unit 13 based on the known format information (step S34), so as to only retain multiple first relevant fields and multiple second relevant fields that are related to inspection. In the embodiment, the anomaly inspection appliance 1 only needs to match one of the multiple first relevant fields with one of the multiple second relevant fields in the step S36.

In the embodiment, the anomaly inspection appliance 1 filters fields that are irrelevant to the inspection through the step S34, so that the multiple first relevant fields and the multiple second relevant fields are not NULL and are all related to each other. Therefore, the inspection effect and the inspection accuracy may be improved effectively.

After the step S36, the anomaly inspection appliance 1 computes the correlation of one of the first packet fields (or a first relevant field) and one of the second packet fields (or a second relevant field) being matched (step S37) and determines whether the correlation being computed is matching with the correlation type recorded in the correlation database 15 (step S38).

If the correlation of the two packet fields is determined to be unmatched with the correlation type recorded in the correlation database 15 in the step S38, or the difference between the degree of the correlation of the two packet fields and the correlation type is greater than a tolerance, the anomaly inspection appliance 1 issues an alarm (step S39), so as to remind the supervisor that the spoofed reporting messages or spoofed reporting instructions may be existed.

Please refer to FIG. 4 at the same time, which is a schematic diagram of a correlation database of an embodiment according to the present disclosure. As shown in FIG. 4, the correlation database 15 records multiple first fields 161 of a first communication protocol 16 and multiple second fields 171 of a second communication protocol 17, wherein one of the multiple first fields 161 is associated with one of the multiple second fields 171 (i.e., the two fields are considered to be relevant fields with each other). Also, the correlation database 15 records the correlation type of each relevant field of the first communication protocol 16 and the second communication protocol 17.

For example, in the embodiment of FIG. 4, the correlation database 15 records that a first field A of the first communication protocol 16 and a second field A of the second communication protocol 17 are relevant fields and the correlation type of the two fields is proportional related. Therefore, when the anomaly inspection appliance 1 transmits the first packet using the first communication protocol 16 and the second packet using the second communication protocol 17 and finds the first field A and the second field B are not proportional related or the difference between the degree of proportional related and the content of the correlation database 15 is greater than the tolerance after breaking the packets down and matching, the anomaly inspection appliance 1 may issue an alarm.

For another example, in the embodiment of FIG. 4, the correlation database 15 records that a first field B of the first communication protocol 16 and a second field C and a second field D of the second communication protocol 17 are relevant fields and the correlation type is inverse related. Therefore, when the anomaly inspection appliance 1 transmits the first packet using the first communication protocol 16 and the second packet using the second communication protocol 17 and finds the first field B and the second field C as well as the second field D are not inverse related or the difference between the degree of inverse related and the content of the correlation database 15 is greater than the tolerance after breaking the packets down and matching, the anomaly inspection appliance 1 may issue an alarm.

For another example, in the embodiment of FIG. 4, the correlation database 15 records that a first field C as well as a first field H of the first communication protocol 16 and a second field G of the second communication protocol 17 are relevant fields and the correlation type is linear related. Therefore, when the anomaly inspection appliance 1 transmits the first packet using the first communication protocol 16 and the second packet using the second communication protocol 17 and finds the first field C as well as the first field H of the first packet and the second field G of the second packet are not linear related or the difference between the degree of linear related and the content of the correlation database 15 is greater than the tolerance after breaking the packets down and matching, the anomaly inspection appliance 1 may issue an alarm.

However, the above descriptions are only few exemplary embodiments of the present disclosure, but not limited thereto.

As mentioned above, the anomaly inspection appliance 1 determines whether the packet fields of two communication protocols have correct correlation based on the content of the correlation database 15 in the storing unit 14 to detect spoofed reporting messages and spoofed reporting instructions. In sum, the establishment of the correlation database 15 is essential to the technical solution provided by the present disclosure.

In the present disclosure, the anomaly inspection appliance 1 establishes the correlation database 15 based on packets that are regularly and normally transmitted. In particular, the anomaly inspection appliance 1 continuously transmits secured first packet (using the first communication protocol) between the controller 2 and the monitoring apparatus 3 and transmits secured second packet (using the second communication protocol identical to or different from the first communication protocol) between the controller 2 and the field apparatus 4 after confirming that the controller 2 is safe. Upon doing so, the anomaly inspection appliance 1 performs statistics to the recorded data in each field of the first packet and the second packet to find the one or more relevant fields of the first communication protocol and the second communication protocol.

Figure 5:
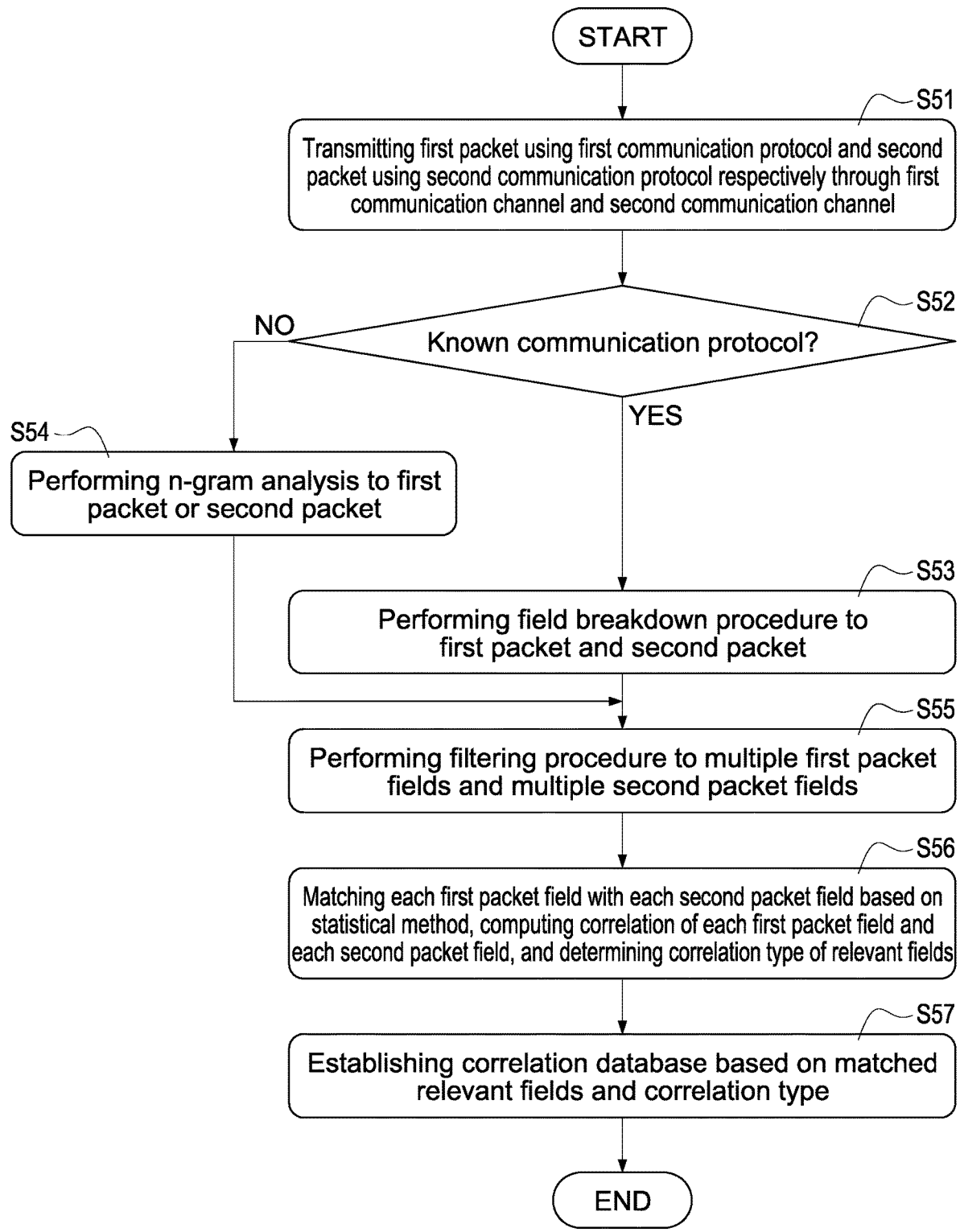
FIG. 5 is a flowchart showing an establishment of a correlation database of an embodiment according to the present disclosure.

Please refer to FIG. 1 through FIG. 5 at the same time, wherein FIG. 5 is a flowchart showing an establishment of a correlation database of an embodiment according to the present disclosure. As shown in FIG. 5, when normally operating, the anomaly inspection appliance 1 transmits the first packet using the first communication protocol and the second packet using the second communication protocol respectively through the first communication channel C1 and the second communication channel C2 (step S51). Next, the anomaly inspection appliance 1 performs the field breakdown procedure to the first packet and the second packet to respectively obtain multiple first packet fields of the first packet and multiple second packet fields of the second packet.

Similar to the inspection steps shown in FIG. 3, after the step S51, the anomaly inspection appliance 1 determines whether the first communication protocol and the second communication protocol are a known communication protocol(s) (step S52). In other words, the anomaly inspection appliance 1 determines whether the field breakdown procedure can be performed to the packets by using known format information (such as the format information recorded in the storing unit 14 (not shown)).

If the determination in the step S52 is positive, the anomaly inspection appliance 1 performs the field breakdown procedure to the first packet and the second packet based on known format information to respectively obtain multiple first packet fields of the first packet and multiple second packet fields of the second packet (step S53). If the first communication protocol or the second communication protocol is determined to be not a known communication protocol in the step S52, the anomaly inspection appliance 1 performs an n-gram analysis to the first packet or the second packet to breakdown all or part of first packet fields of the first packet or all or part of second packet fields of the second packet (step S54).

In the present disclosure, the anomaly inspection appliance 1 continuously transmits the first packet and the second packet and breaks the first packet and the second packet down, matches each first packet field with each second packet field based on a statistical method, computes the correlation of each first packet field and each second packet field (i.e., determines whether each two fields are relevant fields), and determines the correlation type of the relevant fields (step S56). The correlation type may be, for example but not limited to, proportional related, inverse related, or liner related. Lastly, the anomaly inspection appliance 1 establishes the correlation database 15 based on the matched relevant fields and the correlation type(s) of these relevant fields (step S57), and records the correlation database 15 in the storing unit 14.

In another embodiment, the anomaly inspection appliance 1 may match each first packet field with each second packet field through other technical solutions. For example, the anomaly inspection appliance 1 may execute matching through artificial intelligent (AI) or machine learning, but not limited thereto.

In the above embodiment, the anomaly inspection appliance 1 matches the correlations in units of packets. In another embodiment, the anomaly inspection appliance 1 can also use multiple packets or the entire connection as a unit of matching to match the correlations and establish the correlation database 15, but not limited to the above embodiment.

It should be mentioned that, similar to FIG. 3, the supervisor may predefine the packet field(s) of each communication protocol that are relevant to inspection in accordance with passed inspecting exams or experiences and record the predefined packet field(s) to the storing unit 14.

In the embodiment, after breaking the packets down in the step S53 or the step S54, the anomaly inspection appliance 1 performs a filtering procedure to the multiple first packet fields and the multiple second packet fields based on the aforementioned settings, so as to retain multiple first relevant fields of the first packet that are relevant to inspection as well as multiple second relevant fields of the second packet that are relevant to inspection (step S55).

In the embodiment, the anomaly inspection appliance 1 performs the step S56 and the step S57 only based on the multiple first relevant fields and the multiple second relevant fields being retained. Because the step S55 is performed to filter out the fields irrelated to the inspection, the quantity of the rest fields being matched by the anomaly inspection appliance 1 in the step S56 may be reduced. Therefore, the speed of establishing the correlation database 15 may be increased and the accuracy of the correlation database 15 may be improved.

It should be mentioned that, the anomaly inspection appliance 1 may execute the establishing steps of FIG. 5 for many times each for different communication protocol; therefore, the content of the correlation database 15 may be comprehensive so that the correlation database 15 may record multiple relevant fields among multiple known communication protocols. In sum, once the controller 2, the monitoring apparatus 3, and the field apparatus 4 use known communication protocols, the anomaly inspection appliance 1 of the present disclosure may determine whether spoofed reporting messages or instructions exist by inspecting the consistence of the relevant fields of the packets with the content of the correlation database 15.

The anomaly inspection appliance and the anomaly inspection method of the present disclosure may ensure that the data content transmitted between the controller and the monitoring apparatus is consistent with the data content transmitted between the controller and the field apparatus; therefore, the monitoring apparatus may be prevented from displaying wrong information due to the controller under malicious attacks or the field apparatus may be prevented from executing wrong operations due to the controller under malicious attacks.

As the skilled person will appreciate, various changes and modifications can be made to the described embodiment. It is intended to include all such variations, modifications and equivalents which fall within the scope of the present disclosure, as defined in the accompanying claims.

What is claimed is:

1. An anomaly inspection appliance based on correlations of packets, comprising:
 a first communication channel, configured to transmit a first packet using a first communication protocol;
 a second communication channel, configured to transmit a second packet using a second communication protocol;
 a storing unit, storing a correlation database, wherein the correlation database records multiple relevant fields of same communication protocol or different communication protocols and a correlation type of each of the relevant fields; and
 a processing unit connected with the first communication channel, the second communication channel, and the storing unit, configured to perform a field breakdown procedure to the first packet and the second packet to respectively obtain multiple first packet fields and multiple second packet fields, match one of the multiple first packet fields with one of the multiple second packet fields based on the correlation database to compute a correlation, and issue an alarm when the correlation being computed is unmatched with the correlation type;
 wherein the processing unit is configured to execute following actions to establish the correlation database:
 transmitting the first packet using the first communication protocol and the second packet using the second communication protocol respectively through the first communication channel and the second communication channel;
 performing the field breakdown procedure to the first packet and the second packet to respectively obtain the multiple first packet fields and the multiple second packet fields;

matching, based on a statistical method, artificial intelligent, or machine learning, each of the first packet fields with each of the second packet fields to confirm the correlation of each of the first packet fields and each of the second packet fields and the correlation type of the correlation; and establishing the correlation database based on the correlation and the correlation type.

2. The anomaly inspection appliance in claim 1, wherein the first communication protocol and the second communication protocol are identical.

3. The anomaly inspection appliance in claim 1, wherein the first communication channel comprises a first input port and a first output port paired in advance, the first input port is connected to a controller, and the first output port is connected to a monitoring apparatus; the second communication channel comprises a second input port and a second output port paired in advance, the second input port is connected to the controller, and the second output port is connected to a field apparatus.

4. The anomaly inspection appliance in claim 1, wherein the correlation type comprises proportional related, inverse related, or linear related, the processing unit is configured to inquiry the correlation database to obtain one of the multiple first packet fields and one of the second packet fields that are correlated, compute the correlation based on recorded data of the one of the multiple first packet fields and recorded data of the one of the multiple second packet fields, and issue the alarm when the correlation is determined to be unmatched with the correlation type or a difference between a degree of the correlation and the correlation type is greater than a tolerance.

5. The anomaly inspection appliance in claim 4, wherein the processing unit is configured to transmit the first packet and the second packet and determine whether the first communication protocol and the second communication protocol are an unexpected communication protocol, and not inspect the first packet and the second packet if one of the first communication protocol and the second communication protocol is the unexpected communication protocol.

6. The anomaly inspection appliance in claim 4, wherein the processing unit is configured to perform a filtering procedure to the multiple first packet fields and the multiple second packet fields after the field breakdown procedure to retain multiple first relevant fields and multiple second relevant fields that are related to inspection, and match one of the multiple first relevant fields with one of the multiple second relevant fields based on the correlation database to compute the correlation.

7. The anomaly inspection appliance in claim 1, wherein the controller determines whether the first communication protocol or the second communication protocol is a Known communication protocol while establishing correlation database, performs the field breakdown procedure to the first packet and the second packet if the first communication protocol and the second communication protocol are the known communication protocol, and execute an n-gram analysis to the first packet or the second packet to breakdown all or part of the multiple first packet fields or the multiple second packet fields if the first communication protocol or the second communication protocol is not the known communication protocol.

8. The anomaly inspection appliance in claim 1, wherein the controller is configured to, while establishing the correlation database, perform a filtering procedure to the multiple first packet fields and the multiple second packet fields to retain multiple first relevant fields and multiple second relevant fields that are related to inspection and match the multiple first relevant fields with the multiple second relevant fields based on a statistical method.

9. An anomaly inspection method based on correlations of packets, incorporated with an anomaly inspection appliance having a first communication channel and a second communication channel, comprising:
   a) transmitting a first packet using a first communication protocol and a second packet using a second communication protocol respectively through the first communication channel and the second communication channel;
   b) performing a field breakdown procedure to the first packet and the second packet to respectively obtain multiple first packet fields and multiple second packet fields;
   c) matching one of the multiple first packet fields with one of the multiple second packet fields based on the correlation database, wherein the correlation database records multiple relevant fields of same communication protocol or different communication protocols and a correlation type of the relevant fields;
   d) computing a correlation of one of the multiple first packet fields and one of the multiple second packet fields being matched; and
   e) issuing an alarm when the correlation is determined to be unmatched with the correlation type;
   wherein the anomaly inspection method further comprising following steps before the step a):
   a01) transmitting the first packet using the first communication protocol and the second packet using the second communication protocol respectively through the first communication channel and the second communication channel;
   a02) performing the field breakdown procedure to the first packet and the second packet to respectively obtain the multiple first packet fields and the multiple second packet fields;
   a03) matching, based on a statistical method, an artificial intelligent, or machine learning, each of the first packet fields with each of the second packet fields to confirm the correlation of each of the first packet fields and each of the second packet fields and the correlation type of the correlation; and
   a04) establishing the correlation database based on the correlation and the correlation type.

10. The anomaly inspection method in claim 9, further comprising following steps after the step a):
   a1) determining whether the first communication protocol and the second communication protocol are an unexpected communication protocol;
   a2) executing the step b) through the step e) if the first communication protocol and the second communication protocol are not the unexpected communication protocol; and
   a3) not inspecting the first packet and the second packet if one of the first communication protocol and the second communication protocol is the unexpected communication protocol.

11. The anomaly inspection method in claim 9, further comprising a step b1) after the step b): performing a filtering procedure to the multiple first packet fields and the multiple second packet fields to retain multiple first relevant fields and multiple second fields that are related to inspection;

wherein, the step c) comprises matching one of the multiple first relevant fields with one of the multiple second relevant fields based on the correlation database.

12. The anomaly inspection method in claim 9, further comprising following steps after the step a01):
   a011) determining whether the first communication protocol or the second communication protocol is a known communication protocol;
   a012) executing the step a02) if the first communication protocol and the second communication protocol are the known communication protocol; and
   a013) executing an n-gram analysis to the first packet or the second packet to breakdown all or part of the multiple first packet fields or the multiple second packet fields if the first communication protocol or the second communication protocol is not the Known communication protocol.

13. The anomaly inspection method in claim 9, further comprising a step a021) after the step a02) or the step a013):
   performing a filtering procedure to the multiple first packet fields and the multiple second packet fields to retain multiple first relevant fields and multiple second relevant fields that are related to inspection;
   wherein, the step a03) comprises matching the multiple first relevant fields and the multiple second relevant fields based on a statistical method.

* * * * *